July 29, 1958 A. L. HEDRICH ET AL 2,844,961
ULTRASONIC FLOWMETER TRANSDUCER MOUNTING
Filed Jan. 11, 1957
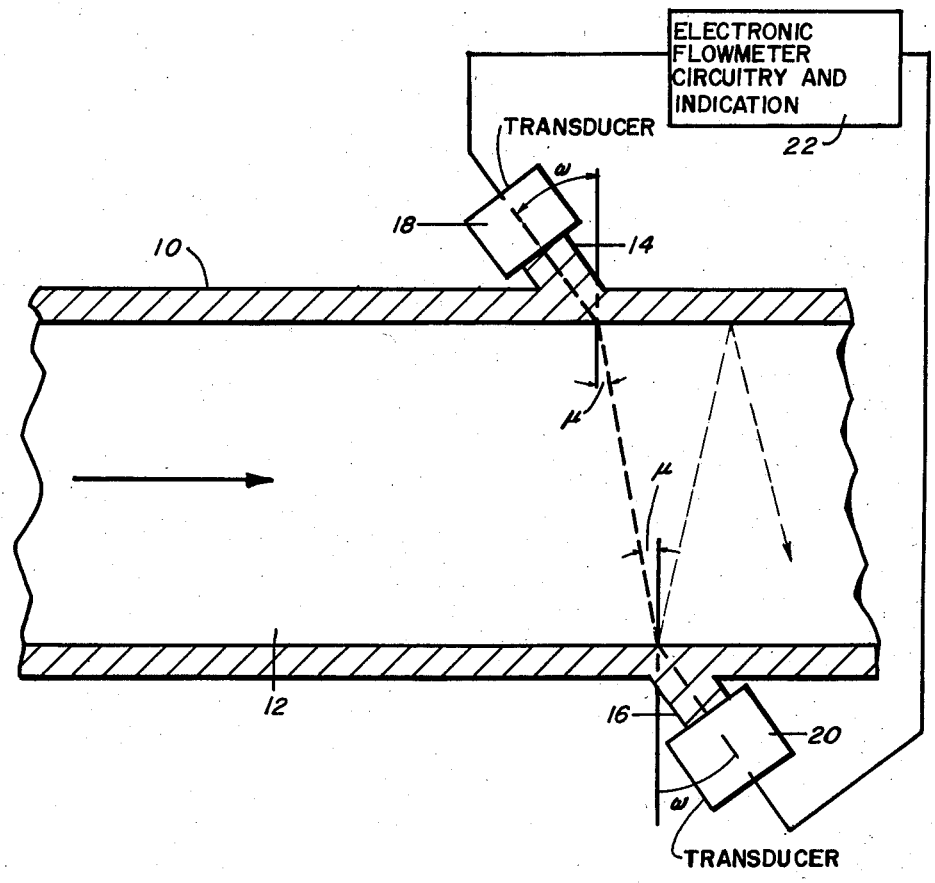
INVENTOR.
Albert L. Hedrich
Don R. Pardue
BY

United States Patent Office 2,844,961
Patented July 29, 1958

2,844,961

ULTRASONIC FLOWMETER TRANSDUCER MOUNTING

Albert L. Hedrich, Bethesda, and Don R. Pardue, Silver Spring, Md., assignors to the United States of America as represented by the Secretary of the Army Application January 11, 1957, Serial No. 633,804

1 Claim. (Cl. 73—194)

(Granted under Title 35, U. S. Code (1952), sec. 266)

The invention described herein may be manufactured and used by or for the Government for governmental purposes without the payment to us of any royalty thereon.

The invention relates to an improved ultrasonic flowmeter transducer mounting and more particularly to a transducer mounting adapted to be employed in conjunction with the apparatus for measuring flow disclosed in Patents Nos. 2,724,269 and 2,752,435.

Those patents disclose improved apparatus for measuring the rate of flow of a medium such as a liquid with high accuracy by means of sound waves. This is accomplished by a system in which two transducers, located at upstream and downstream positions relative to one another, are adapted to alternately function as transmitter and receiver, thereby causing sound waves to travel alternately in upstream and downstream directions between the transducers. Operation of the system is based on a measurement of the difference in phase delay between the upstream and downstream sound waves. This difference in phase delay is proportional to the velocity of flow of the medium. The constant phase delay which is affected by dimensional and temperature variations is thus eliminated. In addition, any phase errors due to changes in the characteristics of the transducers or indicating means are also eliminated in this system because any added phase shift in one direction caused by these factors will be canceled out by an equal added phase shift in the same direction when the transmitter and receiver are interchanged. This additional result can be obtained only where the same transducers and indicating means are used for both the upstream and downstream measurements. Using this system, therefore, it is possible to measure even small flow velocities with high accuracy.

The above-described system of Patent Nos. 2,724,269 and 2,752,435 is satisfactory for conduits fabricated from relatively sound-proof material such as some synthetic resins. Wall transmission and reflection from the walls of such conduits are negligible so that the effects caused thereby do not interfere with the operation of the system. In metal conduits wall transmission is not appreciable and can be reduced by suitably mounting the transducers so as to be mechanically insulated from the conduit. Wall reflection in metal conduits, however, has been a very serious problem, since considerable reflection of the sound wave takes place from the metal walls of the conduit. Such reflections can greatly interfere with the operation of the system. This is especially true because the transducers are alternately functioning as transmitter and receiver. These reflections may cause either amplification or cancellation of the sound wave, thus distorting the received signal.

Accordingly, a broad object of this invention is to provide improved means for measuring the rate of flow of a medium through a metallic pipe by means of sound waves.

Another object of this invention is to adopt the apparatus of the referred-to patents to metallic conduits.

Still another object of this invention is to employ Snell's law to the measurement of rate of flow of a medium through a metallic pipe by means of sound waves.

Briefly, in the present invention, a metallic pipe is provided with protruding bosses to which suitable transducers are coupled. The bosses are so arranged that interference between reflected and transmitted signals is prevented and propagation of the transmitted wave over the desired path between transducers is obtained. The proper arrangement is obtained by applying Snell's law governing angles of refraction of waves passing from one medium to another.

The specific nature of the invention, as well as other objects, uses and advantages thereof, will clearly appear from the following description and from the accompanying drawing, in which:

The drawing is a longitudinal sectional view of a portion of a conduit with parts of the flow measuring system shown schematically.

Referring to the drawing, a metallic pipe or conduit 10 which may be circular in cross-section suitably provides access for a flowing medium 12. The flow of this medium may be in the direction indicated by the enlarged arrow. Pipe 10 is advantageously provided with metallic bosses 14 and 16 preferably disposed substantially obliquely opposite to one another. As will be obvious to those skilled in the art, suitable plugs may be substituted for bosses 14 and 16. Further suitable insulating means may be employed to prevent any sound waves from being transmitted through the pipe walls from the portion of the pipe wall in close proximity to the bosses. Suitable transducers 18 and 20, preferably of the piezo-electric crystal type, are mounted on or suitably coupled with bosses 14 and 16, respectively. Shown schematically and generally at 22 is the remaining portion of the measuring system of the referred-to patents; a more detailed description of portion 22 will be found in those patents.

As is known by those skilled in the art, the ratio of the sines of the angles of incidence and of refraction of transmitted sound waves is constant at the boundary between two isotropic media. This can be expressed by the formula $\sin \omega / \sin \mu$ is equal to the rtatio $v_p/v_m$ where $\omega$ and $\mu$ are the angles shown in the drawing, $v_p$ is the velocity of propagation of sound waves through pipe 10 and $v_m$ is the velocity of propagation of sound waves through medium 12. A sound wave is launched by transducer 18 acting as a transmitter into boss 14 and impinges on the metal and flowing medium interface, at an angle $\omega$ to the normal to the axis of pipe 10. The wave leaves the interface at an angle $\mu$ to the normal. When the sound wave impinges on the opposite wall of the pipe 10, it is refracted back substantially as shown in the drawing, so that a system results that is symmetrical with respect to the two metal bosses 14 and 16.

Signals that are reflected from the interior surfaces of pipe 10 when the sound wave impinges thereon are not reflected back to the transmitting transducer but pass on down the pipe without disturbing the measurement. This result is achieved by disposing the bosses 14 and 16 so that transmitted waves are not reflected back to the transmitter by the surfaces in close proximity to the receiver. Consequently $\mu$, and therefore $\omega$, should be greater than 0°. It will also be evident that the angle $\omega$ should be substantially less than 90°, or total reflection may take place at the juncture of the pipe 10 and the flowing medium 12, without the wave being transmitted through the flowing medium 12.

The effects of wall transmission on the operation of the system have been measured. These measurements show that the signal propagated between the transducers by means of the metal pipe is so much smaller than that propagated through the flowing medium path, that it can be considered quite harmless and negligible for most purposes. The arrangement of the transducers 18 and 20 on the metal pipe 10 as shown in the drawing, therefore, permits the propagation of a relatively strong desirable signal therebetween without producing harmful wall transmission or reflection effects.

It will be understood that the above-disclosed system can be used advantageously with any pipe 10 of sound-reflecting material, whether or not metallic.

It will be apparent that the embodiments shown are only exemplary and that various modifications can be made in construction and arrangement within the scope of the invention as defined in the appended claim.

We claim:

In apparatus for measuring the velocity of flow of a medium by means of sound waves, said apparatus incorporating first and second transducers located at upstream and downstream positions relative to one another, said transducers being adapted to alternately function as transmitter and receiver so as to cause sound waves to travel alternately in upstream and downstream directions between said transducers, the difference in phase delay between the upstream and downstream sound waves being a measure of the rate of flow of the medium, improved mounting means for said transducers to permit the measurement of the velocity of flow of a medium in a metallic conduit without producing harmful reflection effects, said improved mounting means comprising: first and second metallic bosses formed on the external surface of said conduit and disposed substantially obliquely opposite to one another, each of said first and second bosses having a surface adapted to receive said first and second transducers respectively, each transducer being mounted on its boss so that when it functions as a transmitter it will propagate a sound wave through said boss toward said medium at a predetermined angle to a line perpendicular to the direction of flow of said medium as determined by said surface on said associated boss, the velocity of popagation of sound waves in said medium, the location of said bosses on said conduit, and the magnitude of said predetermined angle being chosen in accordance with Snell's law governing angles of refraction of waves passing from one medium to another so that a sound wave propagated from one of said transducers through its boss at said predetermined angle is propagated through said medium through the other boss at said predetermined angle to the other of said transducers, sound waves reflected from the interior surfaces of said conduit in the vicinity of said other boss thereupon passing down said conduit away from said transducers, thereby eliminating any reflection effects.

References Cited in the file of this patent
UNITED STATES PATENTS

| | | |
|---|---|---|
| 2,669,121 | Garman | Feb. 16, 1954 |
| 2,705,422 | Henry | Apr. 5, 1955 |
| 2,724,269 | Kalmus | Nov. 22, 1955 |

OTHER REFERENCES

Publication by Jack Kritz entitled, "Ultrasonic Flowmeter," in November 1955 issue of Instruments and Automation, pages 1912, 1913.